(12) United States Patent
Tremblay

(10) Patent No.: US 8,493,340 B2
(45) Date of Patent: Jul. 23, 2013

(54) VIRTUAL HARD MEDIA IMAGING

(75) Inventor: Christopher Jason Tremblay, Cantley (CA)

(73) Assignee: Corel Corporation, Ottawa, Ontario (CA)

( * ) Notice: Subject to any disclaimer, the term of this patent is extended or adjusted under 35 U.S.C. 154(b) by 408 days.

(21) Appl. No.: 12/464,943

(22) Filed: May 13, 2009

(65) Prior Publication Data
US 2010/0181121 A1 Jul. 22, 2010

Related U.S. Application Data

(60) Provisional application No. 61/145,470, filed on Jan. 16, 2009.

(51) Int. Cl.
*G09G 5/00* (2006.01)

(52) U.S. Cl.
USPC ........ 345/173; 345/156; 345/179; 178/18.06; 178/19.01; 178/19.03; 178/19.04

(58) Field of Classification Search
USPC .............. 345/173–179, 156; 178/18.01–20.2
See application file for complete search history.

(56) References Cited

U.S. PATENT DOCUMENTS

| | | | |
|---|---|---|---|
| 5,596,692 A * | 1/1997 | Martin et al. | 345/443 |
| 6,404,419 B1 | 6/2002 | Nagashima | |
| 2002/0085003 A1 * | 7/2002 | Nagashima | 345/441 |
| 2002/0163510 A1 * | 11/2002 | Williams et al. | 345/179 |
| 2007/0103441 A1 * | 5/2007 | Kong et al. | 345/166 |
| 2010/0182284 A1 * | 7/2010 | Tremblay | 345/179 |

OTHER PUBLICATIONS

Chu, Nelson S.H. et al., "Real-Time Painting with an Expressive Virtual Chinese Brush," IEEE Computer Society, Sep./Oct. 2004, pp. 76-85.

Baxter, William V. et al., "A Versatile Interactive 3D Brush Model," University of North Carolina at Chapel Hill, Department of Computer Science, http://gamma.cs.unc.edu/BRUSH, 10 pages.

* cited by examiner

*Primary Examiner* — Lun-Yi Lao
*Assistant Examiner* — Md Saiful A Siddiqui
(74) *Attorney, Agent, or Firm* — Mark J. Danielson; Pillsbury Winthrop Shaw Pittman LLP

(57) ABSTRACT

The presently disclosed technology teaches using a tilt-sensitive virtual marking implement to render an impression on an electronic presentation device. Further, a bearing measurement and a tilt measurement of the virtual marking implement are made with respect to the surface. The tilt and bearing are then used to vary geometry of an impression profile associated with the physical marking implement as well as an intensity of the rendering. A user may actively vary the impression profile while he or she produces strokes of the virtual marking implement across the surface without changing the physical marking implement selection or switching to a different virtual marking implement. When creating a rendering on a virtual canvas using the virtual marking implement and the surface, a user may wish to vary an orientation of the virtual marking implement so that a corresponding impression profile mimics an impression of a selected physical marking implement.

25 Claims, 12 Drawing Sheets

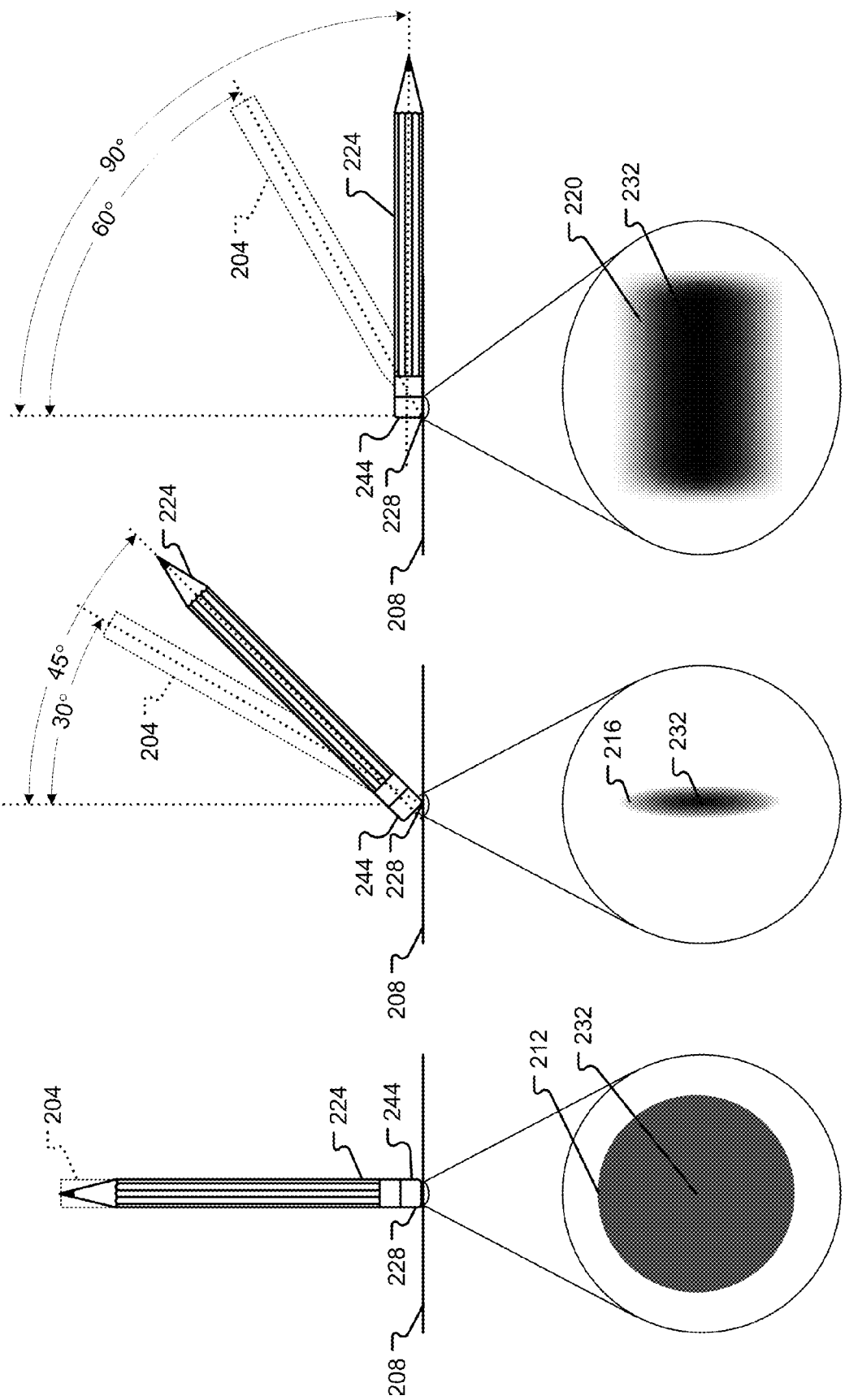

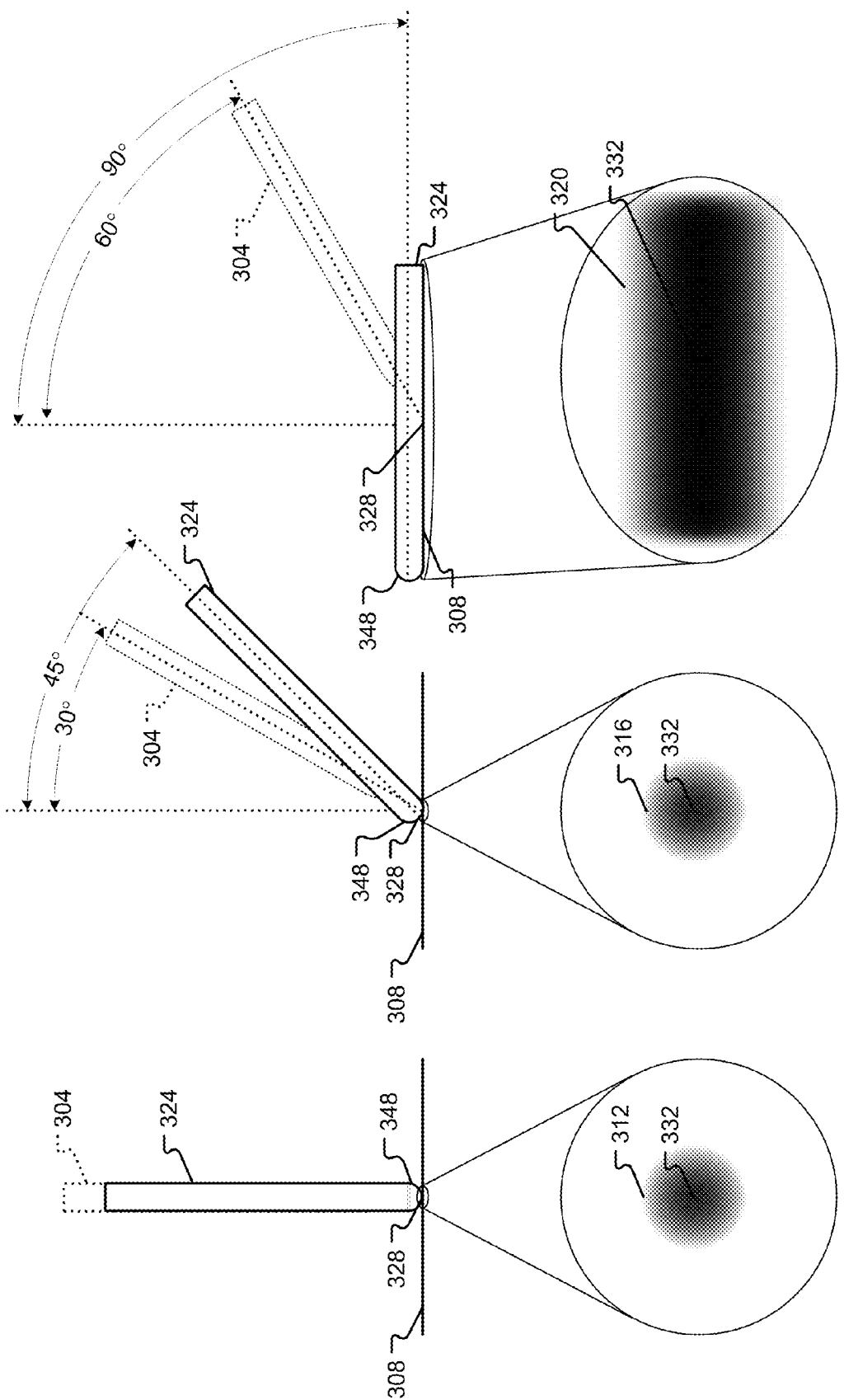

VIRTUAL HARD MEDIA IMAGING

CROSS REFERENCE

This application claims the benefit of U.S. Provisional Application No. 61/145,470, entitled "Virtual Hard Media Imaging," filed Jan. 16, 2009; which is specifically incorporated by reference for all its discloses and teaches.

This application is also related to U.S. Nonprovisional Application No. 12/684,612, entitled "Virtual Faceted Hard Media Imaging" filed Jan. 8, 2010 and U.S. Nonprovisional Application No. 12/684,653, entitled "Temporal Hard Media Imaging" filed Jan. 8, 2010.

BACKGROUND

Various software and hardware tools provide users the ability to create computer rendered images using techniques that replicate physical techniques of creating physical images. These software tools include virtual marking implements that model tip geometries associated with various physical marking implements (e.g. pencils, felt pens, crayons, markers, chalk, erasers, charcoal, pastels, colored pencils, scraperboard tools (i.e. knives, cutters, gauges), conté crayons, and silverpoint). Further, these hardware tools include an electronic stylus combined with an electronic tablet that can approximate the physical feel of the various marking implements and enable the user to emulate movements of a physical marking implement on a surface (e.g. paper, canvas, whiteboard, and chalkboard).

In order to change the tip geometry, the user is typically required to select a different virtual marking implement or modify the tip geometry of the selected virtual marking implement within the software tools. However, in other implementations, the user physically utilizes different electronic styluses that correspond to different tip geometries.

Other implementations have used angle, pressure, tilt, velocity, and other motions of the electronic stylus to vary the size and/or overall opacity of an impression profile associated with the selected physical marking implement. However, past software tools do not vary the geometry and/or intensity of the impression profile (e.g. intensity distribution) based on an angle of the electronic stylus applied to the electronic tablet to model a physical marking implement oriented at the angle.

SUMMARY

The presently disclosed technology teaches a virtual marking implement (e.g. an electronic stylus) with an accelerometer or other way of determining a tilt angle of the virtual marking implement with respect to a surface. Further, the presently disclosed technology teaches determining a bearing of the virtual marking implement with respect to the surface. The angle and bearing are then used to vary geometry of an impression profile associated with a selected physical marking implement as well as the intensity of a rendering on an electronic presentation device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTION OF THE DRAWINGS

The presently disclosed technology is best understood from the following Detailed Description describing various implementations read in connection with the accompanying drawings.

FIG. 2A shows an example physical marking implement with a flat tip oriented vertically with respect to a horizontal tablet surface and a corresponding impression profile on the tablet surface.

FIG. 2B shows an example physical marking implement with a flat tip oriented at 45 degrees from vertical with respect to a horizontal tablet surface and a corresponding impression profile on the tablet surface.

FIG. 2C shows an example physical marking implement with a flat tip oriented horizontally with respect to a horizontal tablet surface and a corresponding impression profile on the tablet surface.

FIG. 3A shows an example virtual marking implement with a round tip oriented vertically with respect to a horizontal tablet surface and a corresponding impression profile on the tablet surface.

FIG. 3B shows an example virtual marking implement with a round tip oriented 45 degrees from vertical with respect to a horizontal tablet surface and a corresponding impression profile on the tablet surface.

FIG. 3C shows an example virtual marking implement with a round tip oriented horizontally with respect to a horizontal tablet surface and a corresponding impression profile on the tablet surface.

DETAILED DESCRIPTIONS

Current electronic styluses fail to adequately model the effect of altering an angle of the electronic stylus with respect to a tablet on an intensity distribution of a selected physical marking implement. Thus, the presently disclosed technology teaches an virtual marking implement or a tilt sensitive input device (e.g. an electronic stylus) with an accelerometer or other way of determining a tilt angle and/or a bearing of the virtual marking implement when applied to a tablet surface (e.g. an electronic tablet). Further, the presently disclosed technology teaches determining bearing of the virtual marking implement with respect to the tablet surface. The angle and bearing are then used to vary geometry of an impression profile associated with the selected physical marking implement as well as the intensity distribution of a rendering on an electronic presentation device.

In a further implementation, an accelerometer based virtual marking implement that does not utilize tablet surface or other surface (e.g. wiimote for Nintendo Wii®) may be used to model the effect of altering an angle and/or bearing of the virtual marking implement on an intensity distribution of a selected physical marking implement. In another implementation, a haptic device (e.g. a virtual marking implement connected to an arm that provides a user force, vibration, and/or motion feedback) may be used to model the effect of altering an angle and/or bearing of the haptic device on an intensity distribution of a selected physical marking implement.

As a result, a user may actively vary the impression profile while he or she produces strokes of the virtual marking implement across the tablet surface without the need to change the physical marking implement selection or switch to a different virtual marking implement. Physical marking implements are described below in varying levels of detail and include, but are not limited to, chalk, markers, pencils, charcoal, erasers, crayons, pastels, felt pens, colored pencils, scraperboard tools (i.e. knives, cutters, gauges), conté crayons, silverpoint, and any solid marking implement that doesn't have hairs (i.e. non-brushes).

Figure 1C:
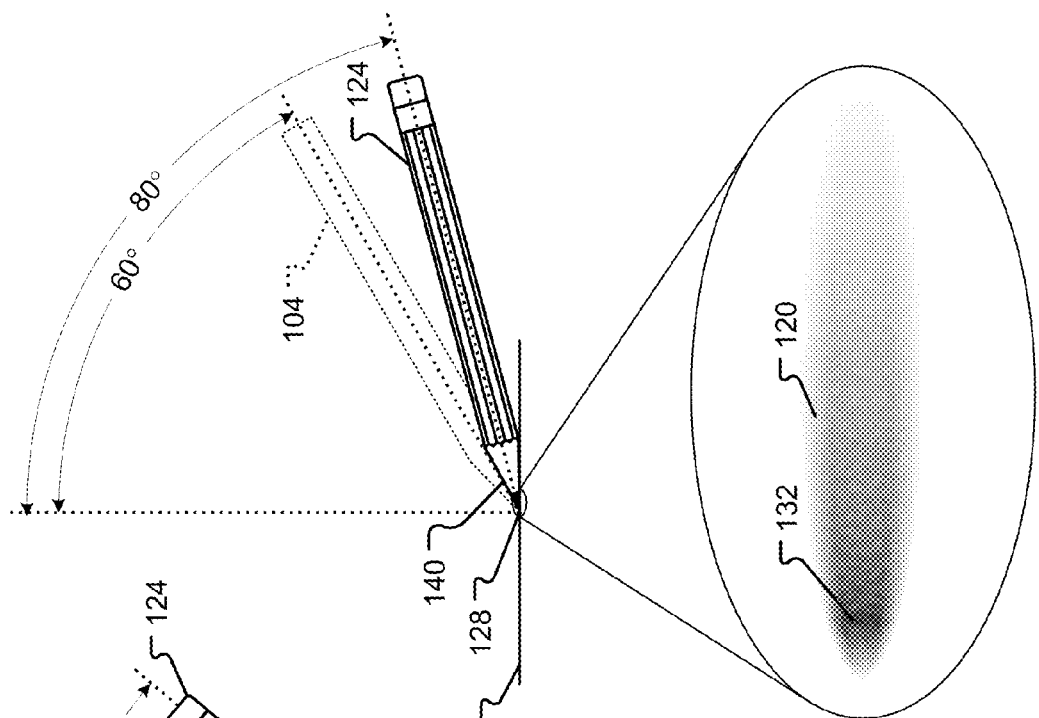
FIG. 1C shows an example physical marking implement with a conical tip oriented at 80 degrees from vertical with respect to a horizontal tablet surface and a corresponding impression profile on the tablet surface.
Figure 1B:
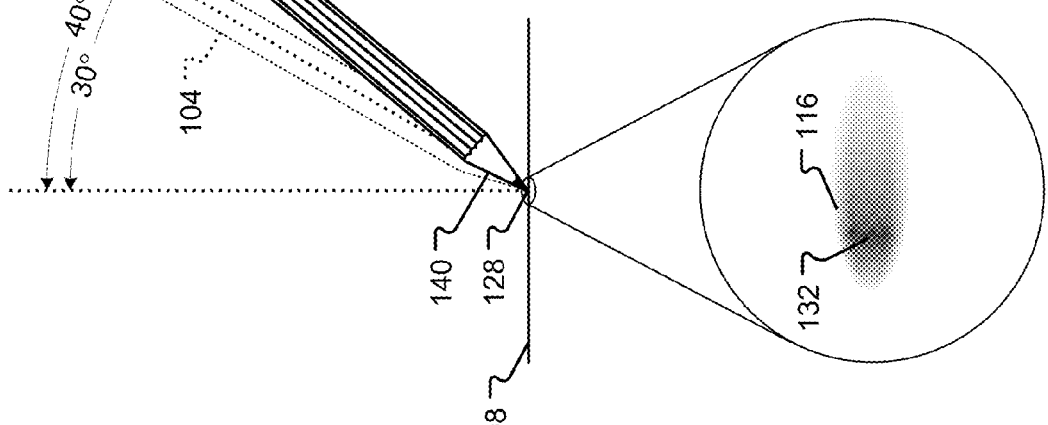
FIG. 1B shows an example physical marking implement with a conical tip oriented at 40 degrees from vertical with respect to a horizontal tablet surface and a corresponding impression profile on the tablet surface.
Figure 1A:
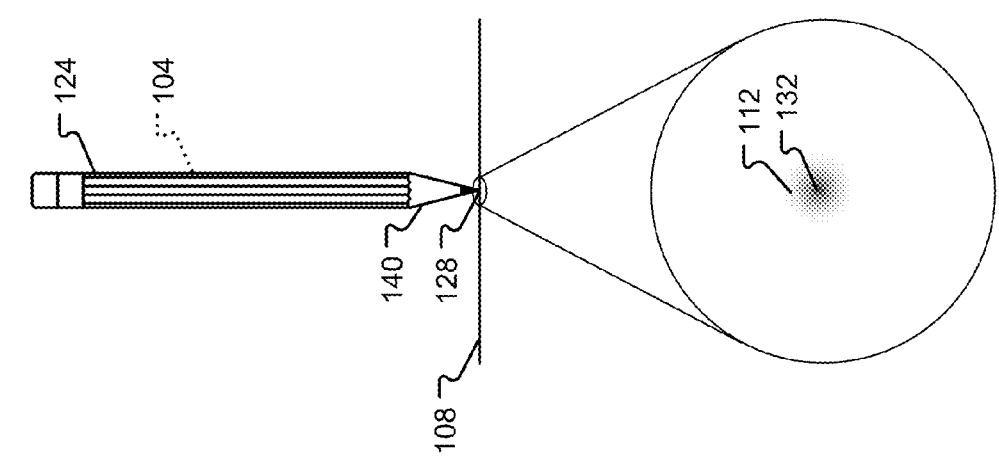
FIG. 1A shows an example physical marking implement with a conical tip oriented vertically with respect to a horizontal tablet surface and a corresponding impression profile on the tablet surface.

When creating a rendering on a virtual canvas using the virtual marking implement and the tablet surface, a user may wish to vary the tip geometry of the virtual marking implement so that a corresponding impression profile mimics an impression of a corresponding physical marking implement at a corresponding orientation. The user may tilt the virtual marking implement with respect to the tablet surface at a variety of tilt angles to achieve a desired impression. FIGS. 1A-1C (described in detail below) illustrate three example tilt angles (0°, 30°, and 60° with respect to a vertical axis) of the virtual marking implement 104 and three corresponding impression profiles 112, 116, 120 that are detail plan views of contact areas 128 (i.e. areas where conical tip 140 of the virtual marking implement 104 is in contact with the tablet surface 108). In some implementations, the tilt angle of the virtual marking implement 104 equals the tilt angle of a corresponding physical marking implement 124.

However, in the implementations shown in FIGS. 1A-1C, the corresponding physical marking implement 124 has a tilt angle that exceeds the tilt angle of the virtual marking implement 104. In FIG. 1A, the virtual marking implement 104 has zero tilt angle and mimics a physical marking implement 124 also with zero tilt angle. In FIG. 1B, however, the virtual marking implement 104 has a 30 degree tilt angle, while the corresponding physical marking implement 124 has a 40 degree tilt angle. Further, in FIG. 1C, the virtual marking implement 104 has a 60 degree tilt angle, while the corresponding physical marking implement 124 has an 80 degree tilt angle.

This enables the user to achieve a wide range of impression profiles even when the ability to detect tilt angles of the virtual marking implement 104 is limited. Further, the user may want to model an impression profile of the physical marking implement 124 without having to tilt the virtual marking implement 104 as much as would be required with the physical marking implement 124. In another implementation, once the tilt angle of the virtual marking implement 104 reaches the limit of tilt angle detection, a maximum tilt angle impression profile may be selected (e.g., an 80° to 90° tilt angle).

Conversely, the user may wish the tilt angle of the virtual marking implement 104 to exceed the corresponding tilt angle of the physical marking implement 124. The user may desire this option to improve his or her accuracy in selecting a desired impression profile based on tilt angle of the virtual marking implement 104. More specifically, greater hand movements of the virtual marking implement 104 mimic smaller hand movements of a corresponding physical marking implement 124.

In other implementations, the impression profile may change at user perceptible tilt angle steps (e.g., an impression profile change for every 5 degrees of tilt). In another implementation, the tilt angle steps may be so small that the impression profile may appear to change uniformly (i.e. imperceptible tilt angle steps).

FIG. 1A shows an example physical marking implement 124 with a conical tip 140 oriented vertically with respect to a horizontal tablet surface 108 and a corresponding impression profile 112 on the tablet surface 108. When the virtual marking implement 104 has zero tilt, as in FIG. 1A, the resulting impression profile 112 is circular with an area of greater intensity 132 in the center of the impression profile 112 and a uniformly fading intensity with distance from the center of the impression profile 112 to an outer edge, here an outer diameter, of the impression profile 112. This impression profile 112 is intended to model a contact area between an implement surface of a pointed physical marking implement tip 140 (e.g., a pencil) and a marking surface where the mark is strongest where the pressure is the greatest, at a center of a point of the physical marking implement 124 contacting a surface and the intensity quickly fades to zero as the pressure fades to zero away from the center of pressure.

FIG. 1B shows an example physical marking implement 124 with a conical tip 140 oriented at 40 degrees from vertical with respect to a horizontal tablet surface 108 and a corresponding impression profile 116 on the tablet surface 108. When the virtual marking implement 104 has some tilt (e.g., 30 degrees as shown in FIG. 1B), the resulting impression profile 116 becomes oblong in a direction of the tilt with the area of greater intensity 132 becoming offset from the center of the impression profile 116 away from the direction of tilt. The impression 116 remains symmetrical about an axis parallel to the tablet surface 108 oriented in the direction of the tilt of the virtual marking implement 104. Similar to impression profile 112, impression profile 116 fades in intensity with distance from the area of greater intensity 132 of the impression profile 116 to an outer edge of the impression profile 116. However, since impression profile 116 is oblong and the area of greater intensity 132 has been offset away from direction of tilt, the fade in intensity to the outer edge of the impression profile 116 is more gradual in the direction of tilt and more rapid in a direction away from the tilt.

FIG. 1C shows an example physical marking implement 124 with a conical tip 140 oriented at 80 degrees from vertical with respect to a horizontal tablet surface 108 and a corresponding impression profile 120 on the tablet surface 108. When the virtual marking implement 104 has even greater tilt (e.g., 60 degrees as shown in FIG. 1C), the resulting impression profile 120 becomes more oblong in the direction of tilt with the area of greater intensity 132 offset very close to the outer edge of the impression profile 120 in the direction away from the tilt. The impression profile 120 remains symmetrical about an axis parallel to the tablet surface 108 oriented in the direction of the tilt of the virtual marking implement 104. Similar to impression profiles 112 and 116, impression profile 120 fades in intensity with distance from the area of greater intensity 132 of the impression profile 120 to an outer edge of the impression profile 120. However, since impression profile 120 is more oblong and the area of greater intensity 132 is offset further away from direction of tilt and close to the outer edge of the impression profile 120, the fade in intensity to the outer edge of the impression 116 is even more gradual in the direction of tilt and even more rapid in the direction away from the tilt.

Impression profiles 112, 116, and 120 are specific to physical marking implements with a conical marking tip 140 such as pencils, markers, crayons, and felt pens. Other impression profiles consistent with other physical marking implements are contemplated herein and discussed below.

FIG. 2A shows an example physical marking implement 224 with a flat tip 244 oriented vertically with respect to a horizontal tablet surface 208 and a corresponding impression profile 212 on the tablet surface 208. When the virtual marking implement 204 has zero tilt, as in FIG. 2A, the resulting impression profile 212 is circular with a uniform intensity 232 across the impression profile 212 and an abruptly fading intensity near the outer edge, here an outer diameter, of the impression profile 212. This impression profile 212 is intended to model an implement surface of a flat physical marking implement tip 244 (e.g., a pencil eraser) against a marking surface. The mark intensity is uniform across the cross-section of the physical marking implement 224 contacting the marking surface (contact area) and the intensity abruptly fades to zero near the edge of the point of contact with the surface. This is because the pressure of the implement surface against the marking surface is generally uniform.

FIG. 2B shows an example physical marking implement 224 with a flat tip 244 oriented at 45 degrees from vertical with respect to a horizontal tablet surface 208 and a corresponding impression profile 216 on the tablet surface 208. When the virtual marking implement 204 has some tilt (e.g., 30 degrees as shown in FIG. 2B), the resulting impression profile 216 becomes oblong in a direction perpendicular to the direction of tilt with an area of greater intensity 232 at the center of the impression profile 216. The impression profile 216 remains symmetrical about axes parallel to the tablet surface 208 oriented in the direction of the tilt of the virtual marking implement 204 and perpendicular to the direction of tilt. Impression profile 216 fades in intensity with distance from the area of greater intensity 232 of the impression profile 216 to an outer edge of the impression profile 216.

FIG. 2C shows an example physical marking implement 224 with a flat tip 244 oriented horizontally with respect to a horizontal tablet surface 208 and a corresponding impression profile 220 on the tablet surface 208. When the virtual marking implement 204 has even greater tilt (e.g., 60 degrees as shown in FIG. 2C), the resulting impression profile 220 rapidly becomes oblong in the direction of tilt as the modeled physical marking implement 224 is laid flat on the tablet surface 208. The resulting impression profile 220 of a 90 degree tilt is an oblong shape with a length equal to nearly equal to a length of a marking portion of the modeled physical marking implement 224. The impression profile 220 remains symmetrical about axes parallel to the tablet surface 208 and oriented in the direction of the tilt and direction perpendicular to the tilt of the virtual marking implement 204. The uniform area of greater intensity fades rapidly in directions perpendicular to the tilt direction.

Impression profiles 212, 216, and 220 are specific to physical marking implements with a flat marking end 244 such as erasers. Other impression profiles consistent with other physical marking implements are contemplated and discussed herein.

FIG. 3A shows an example virtual marking implement 324 with a round tip 348 oriented vertically with respect to a horizontal tablet surface 308 and a corresponding impression profile 312 on the tablet surface 308. When the virtual marking implement 304 has zero tilt, as in FIG. 3A, the resulting impression profile 312 is circular with an area of greater intensity 332 at the center of the impression profile 312 and a uniformly fading intensity with distance from the center of the impression to an outer edge, here an outer diameter, of the impression profile 312. This impression profile 312 is intended to model an implement surface of a rounded physical marking implement tip 348 (e.g., a rounded piece of chalk) contacting a marking surface. The mark is the strongest at a center of a contact area of the physical marking implement 324 and the intensity quickly fades to zero away from the center of the point of contact. The fading of intensity parallels the reduction of pressure away from the center of the contact area for the rounded physical marking implement tip 348 against the marking surface.

FIG. 3B shows an example virtual marking implement 324 with a round tip 348 oriented 45 degrees from vertical with respect to a horizontal tablet surface 308 and a corresponding impression profile 316 on the tablet surface 308. When the virtual marking implement 304 has some tilt (e.g., 30 degrees as shown in FIG. 3B), the resulting impression profile 316 remains the same as impression profile 312. The impression profile 316 remains symmetrical about axes parallel to the tablet surface 308 oriented in the direction of the tilt of the virtual marking implement 304 and perpendicular to the direction of tilt. Impression profile 316 fades in intensity with distance from the area of greater intensity 332 of the impression profile 316 to an outer edge of the impression profile 316.

FIG. 3C shows an example virtual marking implement 324 with a round tip 348 oriented horizontally with respect to a horizontal tablet surface 308 and a corresponding impression profile 320 on the tablet surface 308. When the virtual marking implement 304 has even greater tilt (e.g., 60 degrees as shown in FIG. 3C), the resulting impression profile 320 rapidly becomes oblong in the direction of tilt as the modeled physical marking implement 324 is laid flat on the surface. The resulting impression profile 320 of a 90 degree tilt is an oblong shape with a length equal to nearly equal to a length of the modeled physical marking implement 324. The impression profile 320 remains symmetrical about an axis parallel to the tablet surface 308 and oriented in the direction of the tilt of the virtual marking implement 304. The uniform area of greater intensity fades rapidly in directions perpendicular to the tilt direction.

Impression profiles 312, 316, and 320 are specific to physical marking implements with a round marking end 348 such as rounded chalk. Other impression profiles consistent with other physical marking implements are contemplated and discussed herein.

Figure 4B:
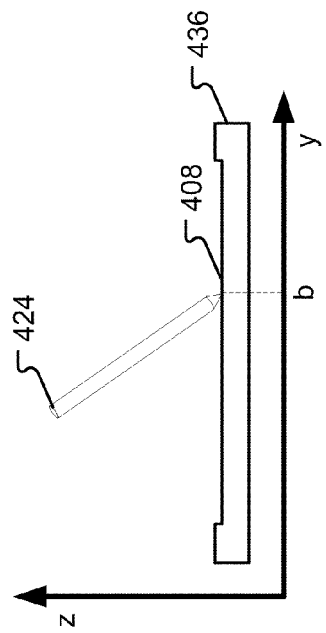
FIG. 4B is an elevation view of the example virtual marking system of FIG. 4 illustrating a tilt of the virtual marking implement in the x-direction.
Figure 4C:
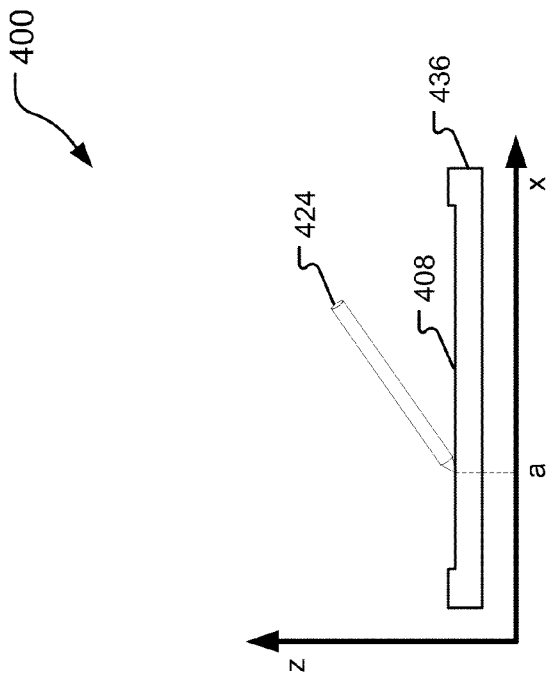
FIG. 4C is an elevation view of the example virtual marking system of FIG. 4 illustrating a tilt of the virtual marking implement in the y-direction.
Figure 4A:
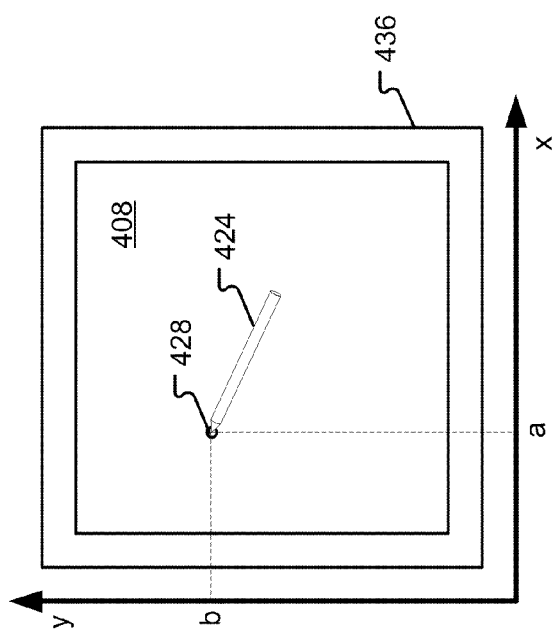
FIG. 4A is a plan view of an example virtual marking system with a virtual tablet and a virtual marking implement with a point of contact position measured in an x-direction and a y-direction.

Referring to FIGS. 4A-AC, a user may utilize an electronic tablet 436 and a virtual marking implement 424 to input changes in tilt as described above with respect to FIGS. 1A-3C. The user orients the virtual marking implement 424 at the desired tilt in x and y directions and contacts the tablet surface 408 at a contact area 428.

In one implementation, virtual marking implement 424 may measure tilt angle and/or direction directly and send that information to a computer. In other implementations, the computer may collect various position data from the virtual marking implement 424 and calculate the tilt of the virtual marking implement 424 based on the collected position data. Further, the x-direction tilt and y-direction tilt may be collected as a tilt angle and directional bearing of the tilt. Alternatively, the x-direction tilt and y-direction may be collected directly and subsequently converted to a tilt angle and directional bearing of the tilt.

In still further implementations, tilt angle and/or direction are determined when the virtual marking implement 424 contacts or comes in close contact with the electronic tablet 436. In other implementations, the computer may monitor the tilt and/or position data sent from the virtual marking implement 424 so long as the virtual marking implement 424 is within range of the computer. Further, the virtual marking implement 424 may utilize accelerometers to determine tilt angle, however, other means for measuring and/or calculating tilt angle and direction are contemplated.

FIG. 4A is a plan view of an example virtual marking system 400 with a virtual tablet 436 and a virtual marking implement 424 with an area of contact position 428 measured in an x-direction and a y-direction. Side edges of the electronic tablet 436 are aligned with coordinate axes x and y. The virtual marking implement 424 is contacting the tablet surface 408 at a contact area 428 defined by distance a in the x-direction and distance b in the y-direction. Further, the virtual marking implement 424 is shown with a tilt angle in the positive x-direction and negative y-direction.

FIG. 4B is an elevation view of the example virtual marking system 400 of FIG. 4 illustrating a tilt of the virtual marking implement 424 in the x-direction. Coordinate axis x is aligned with a side edge of the electronic tablet 436 and coordinate axis z is perpendicular to the tablet surface 408. The virtual marking implement 424 is contacting the tablet surface 408 at the contact area 428 defined by distance a in the x-direction. Further, the virtual marking implement 424 is shown with a tilt angle in the positive x-direction.

FIG. 4C is an elevation view of the example virtual marking system 400 of FIG. 4 illustrating a tilt of the virtual marking implement 424 in the y-direction. Coordinate axis y is aligned with another side edge of the electronic tablet 436 and coordinate axis z is perpendicular to the tablet surface 408. The virtual marking implement 424 is contacting the tablet surface 408 at the contact area 428 defined by distance b in the y-direction. Further, the virtual marking implement 424 is shown with a tilt angle in the negative y-direction.

The generation of an impression profile is based on information received from the user including: selection of a physical marking implement and dimensional information of the physical marking implement. In some implementations, the dimensional information of the physical marking implement is predefined based on common attributes of the selected physical marking implement. In other implementations, the dimensional information of the selected physical marking implement is customizable by the user. For example, the user may specify the physical marking implement's length, diameter, x-sectional profile, and tip angle, and other properties specific to the physical marking implement that the user wishes to model. Further, the generation of an impression profile is based on information received from the virtual marking implement including tilt angle and tilt bearing (or alternatively x-direction tilt and y-direction tilt).

In one implementation, impression profiles are created using bitmaps with bits having varying intensities corresponding to a modeled physical mark. A series of bitmaps are rendered on an electronic presentation device in real-time corresponding to dimensional information and physical properties of the physical marking implement as the tilt angle changes. Further, the maximum size of the bitmap is defined by a dimension of the modeled physical marking implement. In one implementation, the dimension is the greater of the length and width of a marking portion of the physical marking implement. Therefore, the height and width of the maximum bitmap are equal to the greater of the length and width of the marking portion of the physical marking implement. However, the actual size of each rendered bitmap varies according to the tilt angle.

Further, in some implementations, the orientation of each rendered bitmap varies according to bearing of the tilt. More specifically, the height and width of each rendered bitmap is defined by the tilt angle and the orientation of height and width with respect to an x-direction and a y-direction is defined by the bearing of the tilt. This calculation is commonly performed by an affine transform.

The affine transform may be used to scale each rendered bitmap in the direction of the tilt and in directions orthogonal to the tilt. More specifically, the affine transform allows the rendered bitmap to be scaled in two separate directions with distinct scaling ratios. In other implementations, the orientation of height and width with respect to the x-direction and the y-direction may also be calculated using formulae specific to the modeled physical marking implement.

In some implementations, the rendered bitmap is smooth (e.g., a marker). In other implementations, the rendered bitmap is grainy (e.g., chalk). The visual appearance of the bitmap on the electronic presentation device mimics the appearance of the selected physical marking implement on a surface.

Figure 5A:
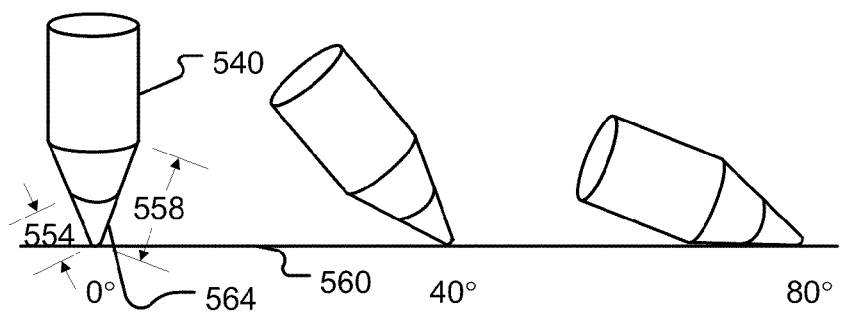
FIG. 5A is an elevation view of a conical tip of an example physical marking implement oriented vertically, at 40 degrees, and at 80 degrees, successively.
Figure 5B:
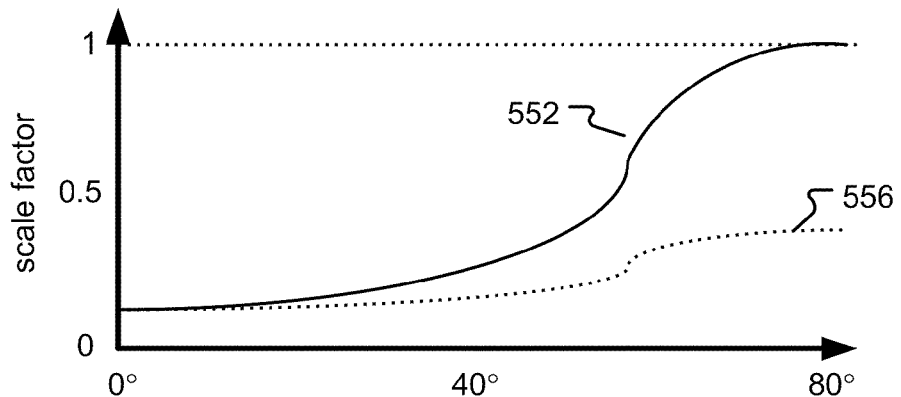
FIG. 5B is an example graph illustrating relationships between tilt angle and scale factor of a corresponding bitmap of the conical tip of FIG. 5A.

FIG. 5A is an elevation view of a conical tip 540 of an example physical marking implement oriented vertically, at 40 degrees, and at 80 degrees, successively. FIG. 5B is an example graph illustrating relationships between tilt angle and scale factor of a corresponding bitmap of the conical tip 540 of FIG. 5A. The size of the corresponding bitmap is expressed as two scale factors of a maximum dimension (discussed above). Referring specifically to the scale factor in the direction of tilt 552, when the physical marking implement is oriented at zero degrees of tilt, the scale factor 552 is very low (here 0.1) because the modeled physical mark is very small. As the physical marking implement is tilted, the scale factor 552 increases, gradually at first because tilt of the conical tip 540 does not initially increase the size of a resulting mark significantly. However, as the conical tip 540 approaches 80 degrees, which is the orientation where the modeled conical tip 540 is flat against a surface 560, the scale factor 552 rapidly increases to 1.

Referring specifically to the scale factor orthogonal to the direction of tilt 556, when the physical marking implement is oriented at zero degrees of tilt, the scale factor 556 is very low, similar to scale factor 552. As the physical marking implement is tilted, the scale factor 556 increases, mirroring scale factor 552, but with much less magnitude.

In one implementation (e.g., a pencil, felt pen, and marker), the dimension of the physical marking implement that defines the maximum bitmap size is a length of the exposed lead or felt 554 along a portion of the conical tip 540 (i.e. a marking portion 564). In other implementations (e.g., crayons, chalk, charcoal, and pastels), the length of the entire conical tip 558 along the portion of the conical tip 540 defines the maximum bitmap size.

Figure 5C:
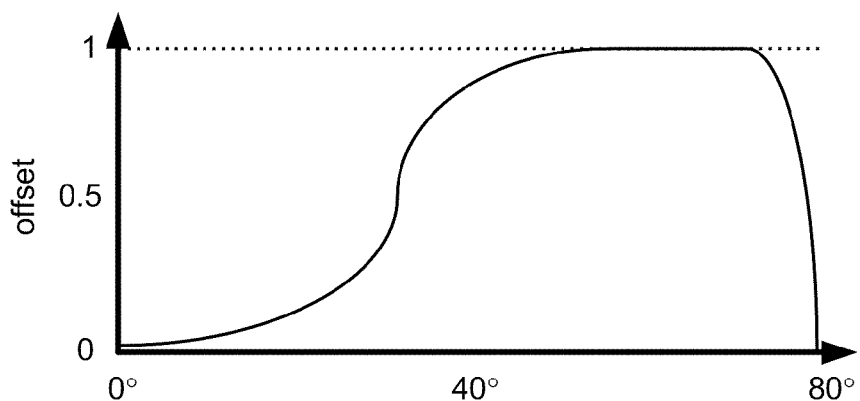
FIG. 5C is an example graph illustrating relationships between tilt angle and offset of a center of intensity of the conical tip of FIG. 5A.

FIG. 5C is an example graph illustrating relationships between tilt angle and offset of a center of intensity of the conical tip 540 of FIG. 5A. When the physical marking implement is oriented at zero degrees of tilt, the offset is zero because the center of intensity of the modeled physical mark is in the middle of the modeled physical mark. As the physical marking implement is tilted, the center of intensity becomes offset from the center of the modeled physical mark in the direction opposite the direction of tilt. However, as the conical tip 540 approaches 80 degrees, which is the orientation where the modeled conical tip 540 is flat against the surface 560, the offset rapidly drops to zero because the center of intensity is uniform across the modeled physical mark in the direction of the tilt. In the implementation shown, there is no offset in the direction orthogonal to the tilt because the center of intensity of the modeled physical mark remains in the middle of the modeled physical mark in the direction orthogonal from the direction of tilt.

Figure 6A:
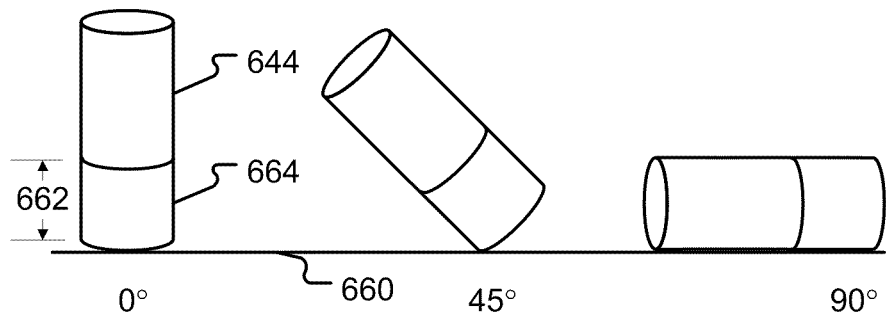
FIG. 6A is an elevation view of a flat tip of an example physical marking implement oriented vertically, at 45 degrees, and at 90 degrees, successively.
Figure 6B:
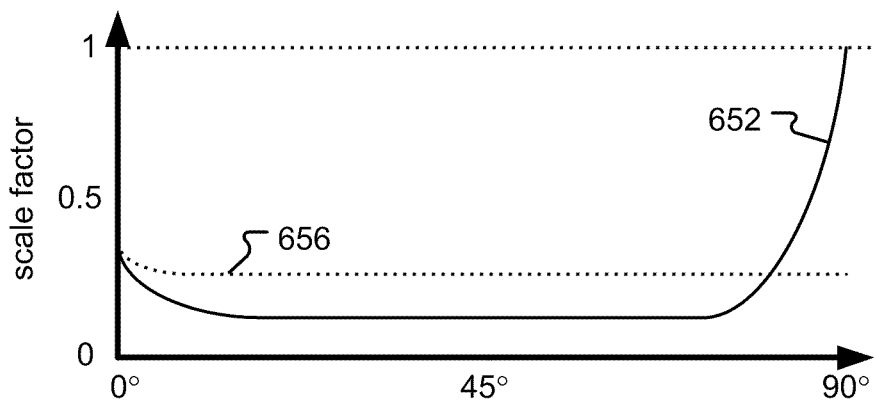
FIG. 6B is an example graph illustrating relationships between tilt angle and scale factor of a corresponding bitmap of the flat tip of FIG. 6A.

FIG. 6A is an elevation view of a flat tip 644 of an example physical marking implement oriented vertically, at 45 degrees, and at 90 degrees, successively. FIG. 6B is an example graph illustrating relationships between tilt angle and scale factor of a corresponding bitmap of the flat tip 644 of FIG. 6A. Referring specifically to the scale factor in the direction of tilt 652, when the physical marking implement is oriented at zero degrees of tilt, the scale factor 652 is fairly low (here 0.3) because the modeled physical mark is the cross-section of the physical marking implement. As the physical marking implement is tilted, initially the scale factor 652 decreases rapidly to 0.1 because only an edge of the flat tip 644 is in contact with a surface 660. However, as the flat tip 644 approaches 90 degrees, the orientation where a side of the modeled physical marking implement is flat against the surface 660, the scale factor 652 rapidly increases to 1.

Referring specifically to the scale factor orthogonal to the direction of tilt 656, when the physical marking implement is oriented at zero degrees of tilt, the scale factor 656 is fairly low, similar to scale factor 652. As the physical marking implement is tilted, the scale factor 656 decreases, mirroring scale factor 652, but decreasing less. However, unlike scale factor 652, scale factor 656 remains constant as the flat tip 644 approaches 90 degrees.

In one implementation, the dimension of the physical marking implement that defines the maximum bitmap size is the greater of a diameter of the physical marking implement and a length of a marking portion 664 of the physical marking implement. More specifically, in an implementation where the marking portion 664 runs the entire length of the physical marking implement (e.g., a crayon without a label, piece of chalk, piece of charcoal, and pastel)), the greater dimension is the length rather than the diameter of the physical marking implement. In another implementation where the marking portion length 662 is only a portion of the entire length of the physical marking implement (e.g., a pencil eraser and a crayon with a label); the greater dimension may be the diameter rather than the length of the physical marking implement.

Figure 6C:
FIG. 6C is an example graph illustrating relationships between tilt angle and offset of a center of intensity of the flat tip of FIG. 6A.

FIG. 6C is an example graph illustrating relationships between tilt angle and offset of a center of intensity of the flat tip 644 of FIG. 6A. The offset value for the flat physical marking implement tip 644 is zero in all directions for tilt angles ranging from zero degrees to ninety degrees because the center of intensity of the modeled physical mark remains in the middle of the modeled physical mark for all the shown tilt angles.

Figure 7A:
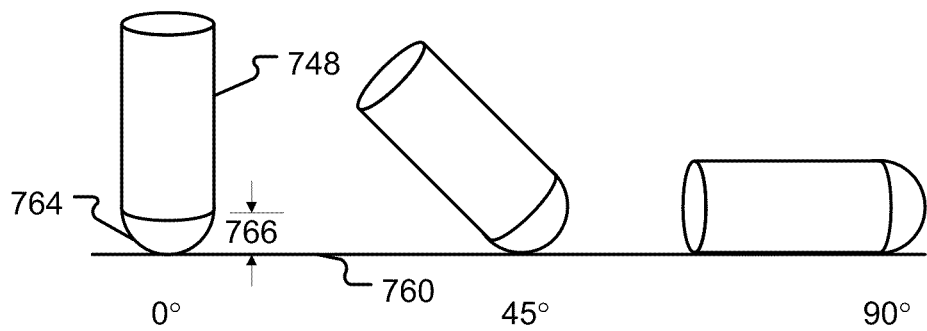
FIG. 7A is an elevation view of a round tip of an example physical marking implement oriented vertically, at 45 degrees, and at 90 degrees, successively.
Figure 7B:
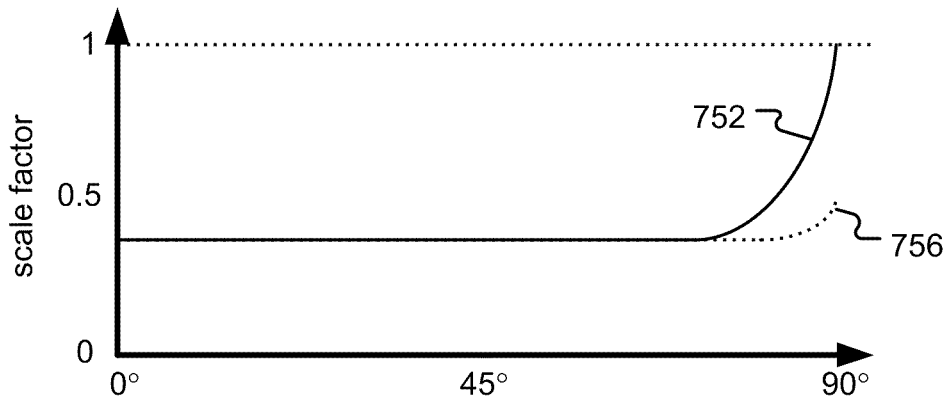
FIG. 7B is an example graph illustrating relationships between tilt angle and scale factor of a corresponding bitmap of the round tip of FIG. 7A.

FIG. 7A is an elevation view of a round tip 748 of an example physical marking implement oriented vertically, at 45 degrees, and at 90 degrees, successively. FIG. 7B is an example graph illustrating relationships between tilt angle and scale factor of a corresponding bitmap of the round tip 748 of FIG. 7A. Referring specifically to the scale factor in the direction of tilt 752, when the physical marking implement is oriented at zero degrees of tilt, the scale factor 752 is fairly low (here 0.3) because the modeled physical mark is a point of contact of the round tip 748 of the physical marking implement with a surface. As the physical marking implement is tilted, initially the scale factor 752 remains the same because the point of contact merely moves to the side of the round tip 748 but does not significantly change in size or shape. However, as the physical marking implement approaches 90 degrees, which is the orientation where the modeled physical marking implement is flat against a surface 760, the scale factor 752 rapidly increases to 1 (assuming a marking portion 764 runs the entire length of the physical marking implement). In other implementations where a marking portion length 766 is only the rounded part of the round tip 748, not the remainder of the length of the physical marking implement and/or rounded tip 748, as the physical marking implement approaches 90 degrees, the scale factor 752 rapidly decreases to zero or near zero.

Referring specifically to the scale factor orthogonal to the direction of tilt 756, the scale factor 756 initially mirrors scale factor 752 because the point of contact merely moves to the side of the round tip 748 but does not significantly change in size or shape. However, as the physical marking implement approaches 90 degrees, scale factor 756 increases much less than scale factor 752 because the physical marking implement is relatively long in the direction of scale factor 752 and relatively thin in the direction of scale factor 756.

In one implementation, the dimension of the physical marking implement that defines the maximum bitmap size is the greater of a diameter of the physical marking implement and a length of the marking portion 764 of the physical marking implement. More specifically, in an implementation where the marking portion 764 runs the entire length of the physical marking implement (e.g., a crayon without a label, piece of chalk, piece of charcoal, and pastel)), the greater dimension is the length rather than the diameter of the physical marking implement. In another implementation where the marking portion length 766 is only a portion of the entire length of the physical marking implement (e.g., a pencil eraser and a crayon with a label); the greater dimension may be the diameter rather than the length of the physical marking implement.

Figure 7C:
FIG. 7C is an example graph illustrating relationships between tilt angle and offset of a center of intensity of the round tip of FIG. 7A.

FIG. 7C is an example graph illustrating relationships between tilt angle and offset of a center of intensity of the round tip 748 of FIG. 7A. An offset value in all directions is zero for tilt angles ranging from zero degrees to ninety degrees because the center of intensity of the modeled physical mark remains in the middle of the modeled physical mark for all the shown tilt angles.

In some implementations, the relationship between tilt angle and size of a corresponding bitmap in a direction perpendicular to the tilt is the same as in the direction of the tilt. In other implementations, the relationship between tilt angle and size of a corresponding bitmap in a direction perpendicular to the tilt is different from the relationship between tilt angle and size of a corresponding bitmap in the direction of the tilt.

FIG. 7 shows an example virtual marking implement 704 at three orientations (A, B, and C) with respect to a tablet surface 708 and three corresponding bitmaps 740, 744, and 748. Bitmaps 740, 744, and 748 are constrained to a bit number corresponding to a maximum dimension of the modeled physical marking implement (discussed above). The modeled physical marking implement 724 has a conical tip 740, similar to that of FIG. 1 and Graphs A of FIG. 5.

Figure 8C:
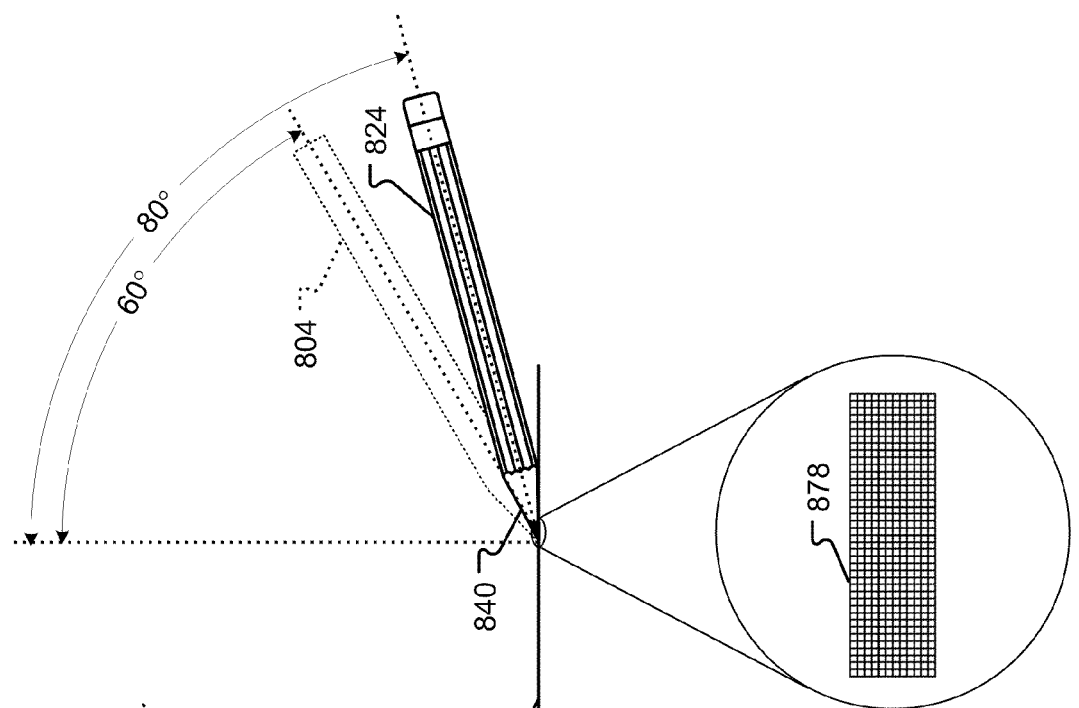
FIG. 8C shows an example physical marking implement with a conical tip oriented at 80 degrees from vertical with respect to a horizontal tablet surface and a corresponding bitmap.
Figure 8B:
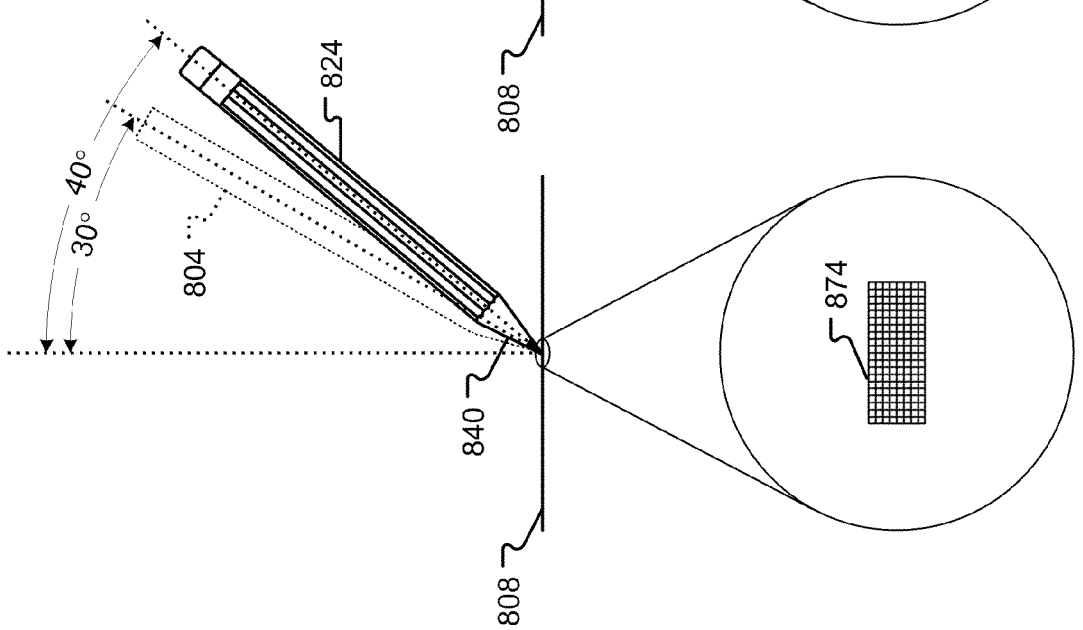
FIG. 8B shows an example physical marking implement with a conical tip oriented at 40 degrees from vertical with respect to a horizontal tablet surface and a corresponding bitmap.
Figure 8A:
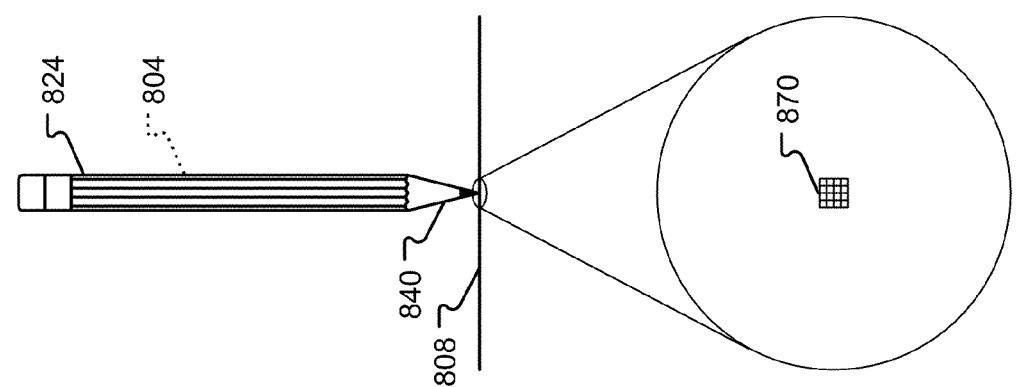
FIG. 8A shows an example physical marking implement with a conical tip oriented vertically with respect to a horizontal tablet surface and a corresponding bitmap.

FIG. 8A shows an example physical marking implement 824 with a conical tip 840 oriented vertically with respect to a horizontal tablet surface 808 and a corresponding bitmap 870. Bitmap 870 is square with a relatively small scale factor (e.g., four bits by four bits).

FIG. 8B shows an example physical marking implement 824 with a conical tip 840 oriented at 40 degrees from vertical with respect to a horizontal tablet surface 808 and a corresponding bitmap 874. Bitmap 874 becomes larger and oblong in a direction of tilt when compared to bitmap 870 (e.g., eight bits by twenty bits).

FIG. 8C shows an example physical marking implement 824 with a conical tip 840 oriented at 80 degrees from vertical with respect to a horizontal tablet surface 808 and a corresponding bitmap 878. Bitmap 878 becomes even larger and more oblong in the direction of tilt when compares to bitmap 870 and bitmap 874 (e.g., twelve bits by forty bits). In one implementation, forty bits corresponds to the maximum dimension of the modeled physical marking implement 824.

Similarly, bitmaps may be generated for tip orientations other than conical tips (e.g., flat tips and round tips). Such bitmaps will still be constrained to a bit number corresponding to a maximum dimension of the modeled physical marking implement. Bitmaps for each tip orientation will depend on the form factor of the impression profile at each tilt angle.

Once a bitmap size is determined, an intensity value is determined for each of the bits in the bitmap. The intensity value for each bit mimics an intensity of the corresponding location in a mark made by a physical marking implement on a surface. The resulting bitmap with intensities is the impression profile discussed above with respect to FIGS. 1A-3C.

Figure 9:
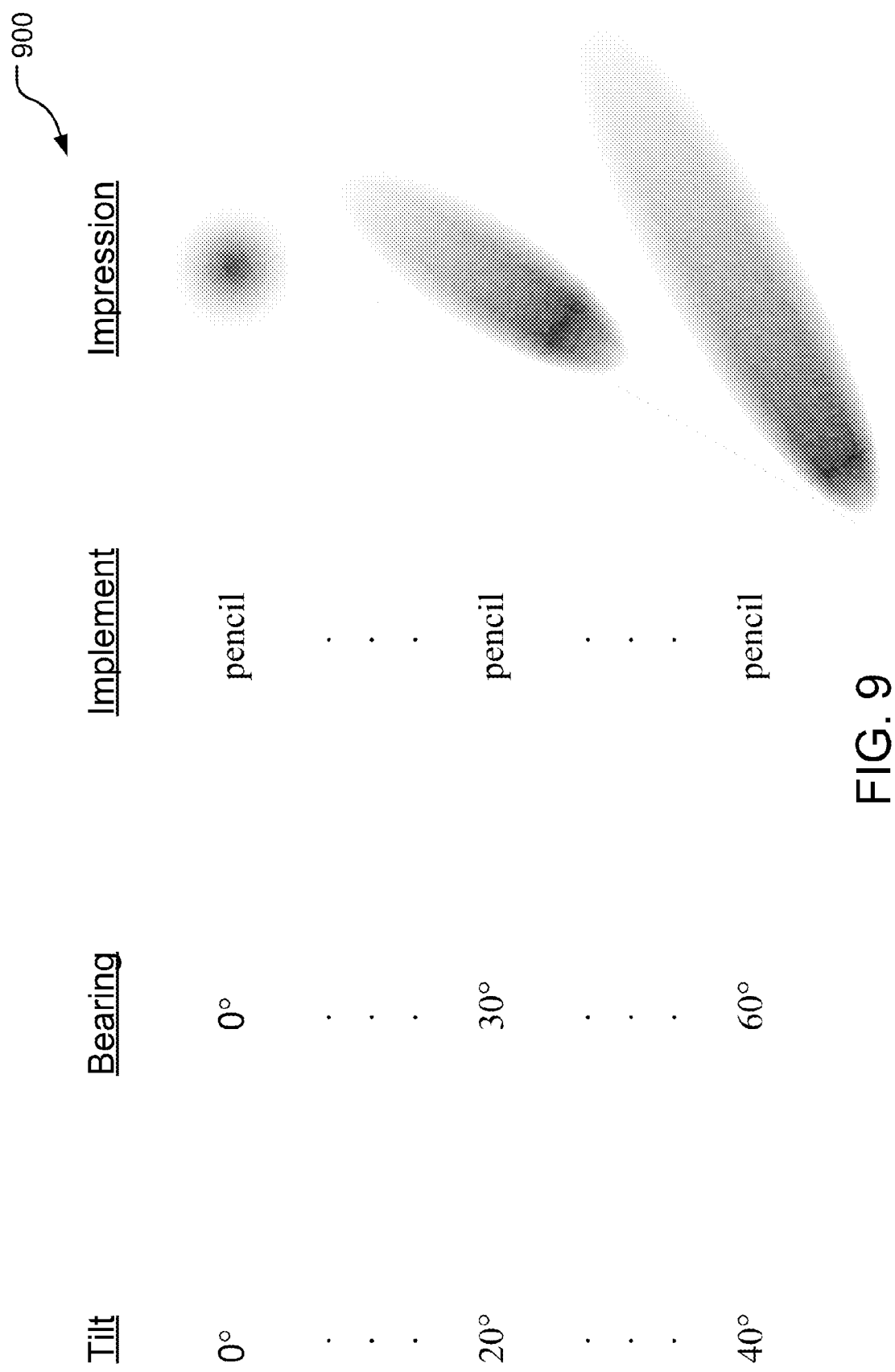
FIG. 9 shows an example look-up table for impression profiles indexed by tilt, bearing, and type of physical marking implement.

FIG. 9 shows an example look-up table 900 for impression profiles indexed by tilt, bearing, and type of physical marking implement. More specifically, the example look-up table 900 is for a pencil and shows example impression profiles for the pencil at 0 degrees tilt and 0 degrees bearing; 20 degrees tilt and 30 degrees bearing; and 40 degrees tilt and 60 degrees bearing. The selected tilt and bearing combinations shown in example look-up table 900 are examples only. There may be many more combinations of tilt, bearing, and type of physical marking implement indexed in look-up tables. Further, additional properties may be included in the look-up tables. In one implementation, all possible bearings and types of physical marking implements are tabulated for each tilt angle.

In another implementation, at least one tip geometry for each available physical marking implement oriented at each available tilt angle and bearing is saved in a database associated with a drawing application. Further, multiple tip geometries for each physical marking implement may be stored in the database corresponding to multiple lengths, widths, or other variable properties of the selected physical marking implement. In one implementation, a user selects a physical marking implement in the drawing application. In another implementation, the user modifies default tip geometry associated with the selected physical marking implement thereby creating a custom tip geometry. In still other implementations, the user creates a tip geometry from scratch using dimensional and marking characteristics of the physical marking implement that the user wishes to model.

All bitmaps for a selected tip geometry are generated based on the look-up tables. The drawing application monitors a tablet surface for contact by a virtual marking implement. Once the virtual marking implement makes contact with the tablet surface, the computer application reads tilt and bearing information (or alternatively tilt in x-direction and y-direction) and selects the bitmap that corresponds best to the measured tilt and bearing information. The drawing application then adjusts the bitmap and renders the appropriate mark on a presentation device. In one implementation, the drawing application repeatedly monitors the tablet surface for tilt and bearing information at a high rate and adjusts the rendering as the user changes tilt and bearing of the virtual marking implement. This may be done rapidly and/or at a high rate to render the marking for the user in real-time.

In an alternative implementation, the look-up tables may not contain impression profiles for all available bearing and tilt angles. The drawing application can calculate in real-time changes in impression profile based on changes in tilt and/or angle by applying a function that modifies a stored impression profile to the appropriate tilt and bearing.

In yet another implementation, the drawing application renders marks on a presentation device without the use of the one or more look-up tables. Here, the drawing application reads tilt and bearing information and generates bitmaps in real-time that correspond best to the measured tilt and bearing information based on a combination of physical marking implement settings, curves, and measurements. The drawing application then adjusts the bitmaps and renders the appropriate impression profiles on the presentation device.

In still another implementation, bitmaps are generated in real-time and stored in a cache. While rendering marks on the presentation device, the drawing application retrieves bitmaps from the cache corresponding to measured tilt and bearing information. If an appropriate bitmap does not exist in the cache for the measured tilt and bearing information, the drawing application generates a new bitmap for that combination of tilt and bearing and stores the new bitmap in the cache.

Figure 10:
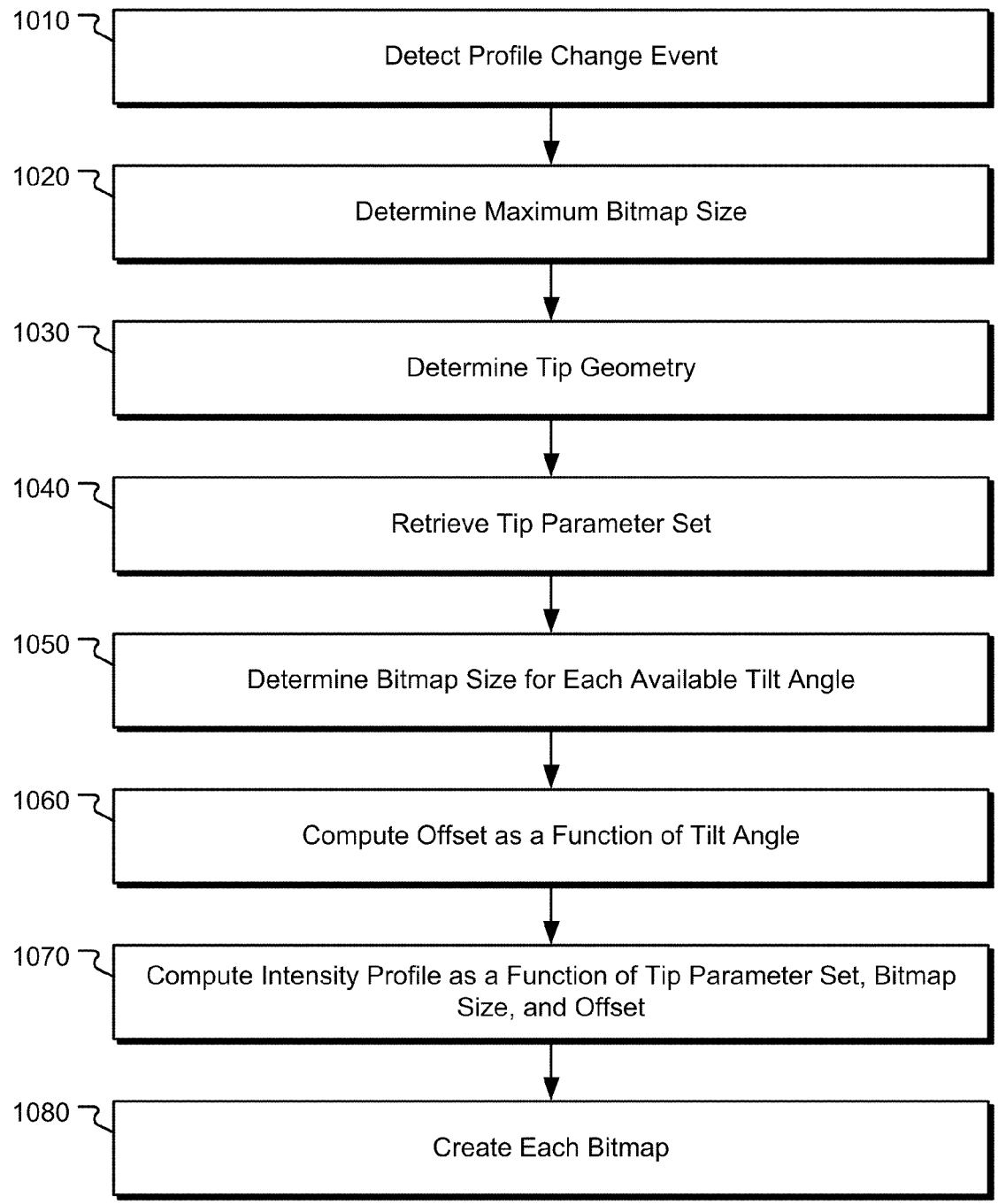
FIG. 10 is a flow chart illustrating an example process for creating impression bitmaps based on impression profiles defined by tilt and bearing of a selected physical marking tool.

FIG. 10 is a flow chart illustrating an example process for creating impression bitmaps based on impression profiles defined by tilt and bearing of a selected physical marking tool. A drawing application detects a profile change event input from the user 1010. The profile change event is any input that results in a modification of the impression profile. For example, the user may create a new tip geometry, select a different physical marking implement, or modify the selected physical marking implement. Further, the user may change the orientation of a virtual marking implement resulting in a different tilt and/or bearing of the virtual marking implement.

Next, the drawing application determines the maximum bitmap size of the selected physical marking implement 1020. The drawing application then determines tip geometry based on the selected physical marking implement and/or user created tip geometry 1030. Using the selected tip geometry and determined maximum bitmap size, the drawing application then retrieves tip parameter sets that define properties of the selected physical marking implement 1040. These properties include, but are not limited to, scaling factors, intensity curves or functions, and impression profile look-up tables.

The drawing application then determines bitmap sizes by applying scale factors based on tilt angles to the maximum bitmap size of the selected physical marking implement 1050. There may be separate scale factors for tilt in the x-direction and the y-direction, or alternatively each scale factor may apply to tilt in both the x-direction and the y-direction. The drawing application then determines an offset dimension based on the tilt of the virtual marking implement 1060. The offset dimension defines the direction and magnitude of an offset between the center of intensity of each bitmap with respect to the dimensional center of each bitmap. Generally, at zero degrees of tilt, the offset dimension is zero. The offset dimension may increase when the virtual marking implement is tilted.

An intensity profile is generated based on the tip parameter set, the bitmap size, and the offset dimension 1070. The intensity profile is applied to the bitmap size to generate a bitmap unique to a specific combination of tip geometry, tilt, and bearing 1080.

Figure 11:
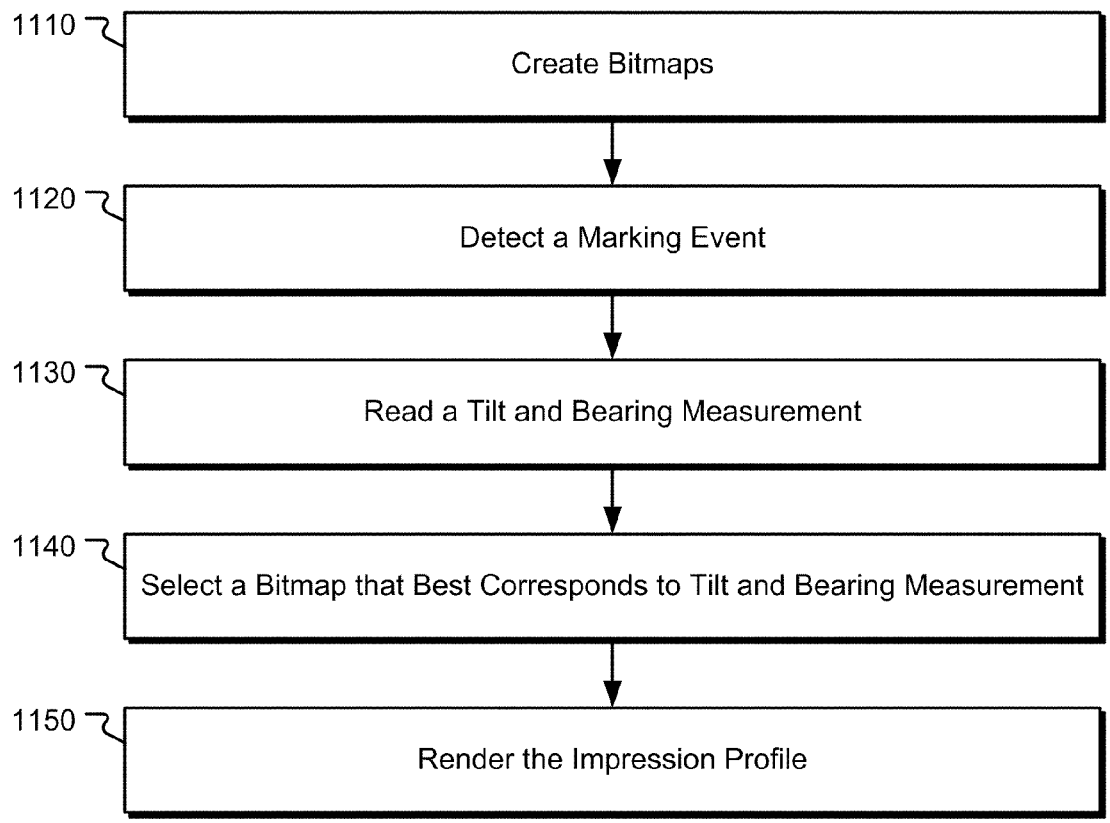
FIG. 11 is a flow chart illustrating an example process for rendering an impression profile based on tilt and bearing of a selected physical marking tool.

FIG. 11 is a flow chart illustrating an example process for rendering an impression profile based on tilt and bearing of a selected physical marking tool. A set of bitmaps unique to a specific combination of tip geometry, tilt, and bearing are created 1110. See FIG. 10 for example. A drawing application detects a marking event input from a user 1120. The marking event is an input that is intended to result in a rendering of an impression profile on an electronic presentation device. For example, the user may contact a surface of an electronic tablet with a virtual marking implement and drag the virtual marking implement across the electronic tablet.

Once the drawing application detects a marking event, the drawing application reads a tilt measurement and a bearing measurement from the virtual marking implement 1130. Then, the drawing application selects a bitmap from the set of bitmaps that best corresponds to the tilt and bearing measurement 1140. Finally, utilizing the geometry and intensity distribution of the selected bitmap, the drawing application renders the impression profile on the electronic display 1150. In another implementation, the "create bitmaps" operation 1110 is performed in real-time by the drawing application based on the "read a tilt and bearing measurement" operation 1130.

Figure 12:
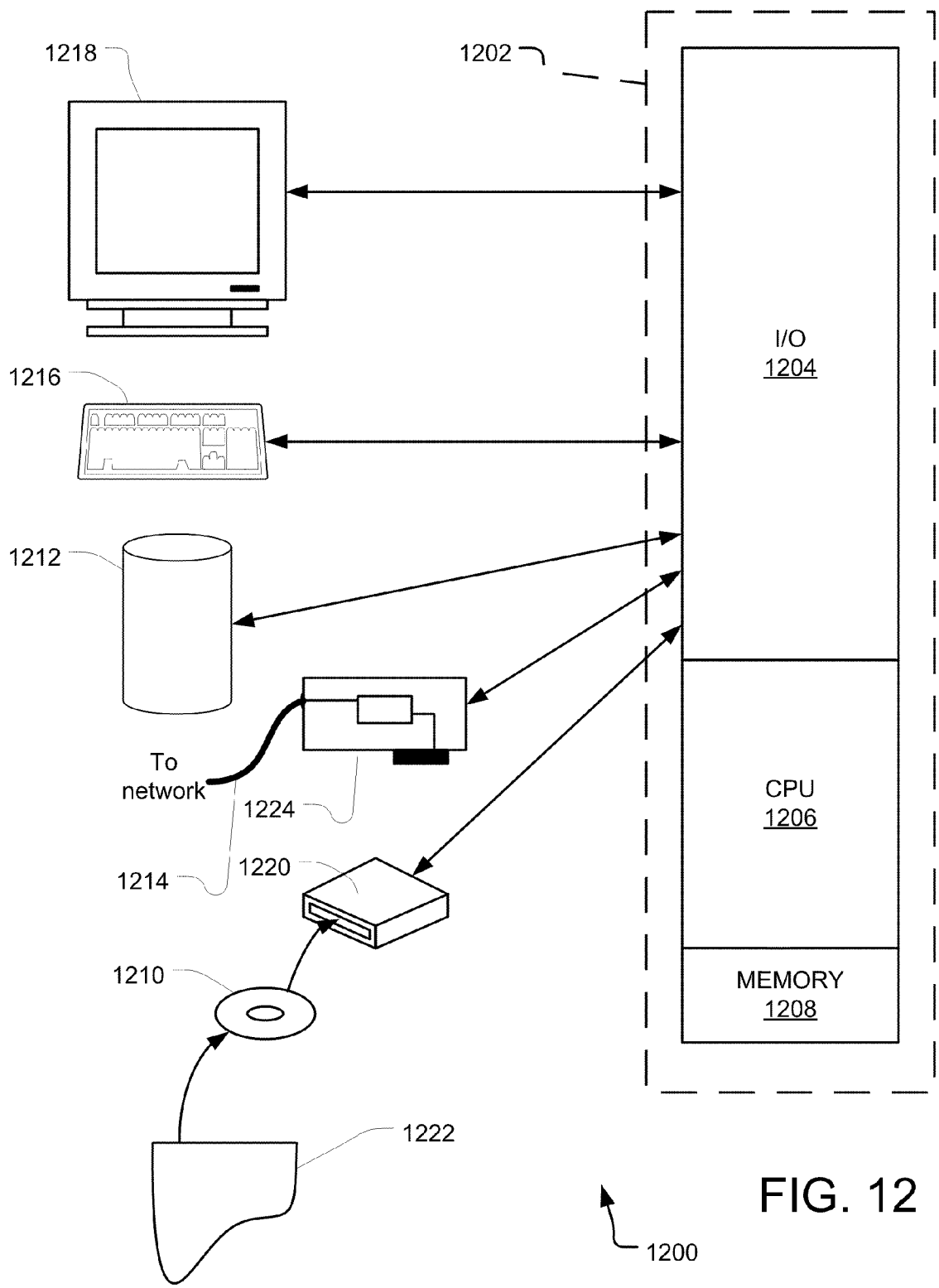
FIG. 12 illustrates an example computing system that can be used to implement the described technology.

FIG. 12 illustrates an example computing system that can be used to implement the described technology. A general purpose computer system 1200 is capable of executing a computer program product to execute a computer process. Data and program files may be input to the computer system 1200, which reads the files and executes the programs therein. Some of the elements of a general purpose computer system 1200 are shown in FIG. 12 wherein a processor 1202 is shown having an input/output (I/O) section 1204, a Central Processing Unit (CPU) 1206, and a memory section 1208. There may be one or more processors 1202, such that the processor 1202 of the computer system 1200 comprises a single central-processing unit 1206, or a plurality of processing units, commonly referred to as a parallel processing environment. The computer system 1200 may be a conventional computer, a distributed computer, or any other type of computer. The described technology is optionally implemented in software devices loaded in memory 1208, stored on a configured DVD/CD-ROM 1210 or storage unit 1212, and/or communicated via a wired or wireless network link 1214 on a carrier signal, thereby transforming the computer system 1200 in FIG. 12 to a special purpose machine for implementing the described operations.

The I/O section 1204 is connected to one or more user-interface devices (e.g., a keyboard 1216 and a display unit 1218), a disk storage unit 1212, and a disk drive unit 1220. Display unit 1218 may be any presentation device adapted to present information to a user. Generally, in contemporary systems, the disk drive unit 1220 is a DVD/CD-ROM drive unit capable of reading the DVD/CD-ROM medium 1210, which typically contains programs and data 1222. Computer program products containing mechanisms to effectuate the systems and methods in accordance with the described technology may reside in the memory section 1204, on a disk storage unit 1212, or on the DVD/CD-ROM medium 1210 of such a system 1200. Alternatively, a disk drive unit 1220 may be replaced or supplemented by a floppy drive unit, a tape drive unit, or other storage medium drive unit. The network adapter 1224 is capable of connecting the computer system to a network via the network link 1214, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, gaming consoles, set top boxes, etc.

When used in a LAN-networking environment, the computer system 1200 is connected (by wired connection or wirelessly) to a local network through the network interface or adapter 1224, which is one type of communications device. When used in a WAN-networking environment, the computer system 1200 typically includes a modem, a network adapter, or any other type of communications device for establishing communications over the wide area network. In a networked environment, program modules depicted relative to the computer system 1200 or portions thereof, may be stored in a remote memory storage device. It is appreciated that the network connections shown are exemplary and other means of and communications devices for establishing a communications link between the computers may be used.

In an example implementation, a drawing module that performs operations described herein may be incorporated as part of the operating system, application programs, or other program modules. Further, a database containing impression profile look-up tables may be stored as program data in memory 1208 or other storage systems, such as disk storage unit 1212 or DVD/CD-ROM medium 1210.

The present specification provides a complete description of the methodologies, systems and/or structures and uses thereof in example implementations of the presently-described technology. Although various implementations of this technology have been described above with a certain degree of particularity, or with reference to one or more individual implementations, those skilled in the art could make numerous alterations to the disclosed implementations without departing from the spirit or scope of the technology hereof. Since many implementations can be made without departing from the spirit and scope of the presently described technology, the appropriate scope resides in the claims hereinafter appended. Other implementations are therefore contemplated. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular implementations and are not limiting to the embodiments shown. Changes in detail or structure may be made without departing from the basic elements of the present technology as defined in the following claims.

What is claimed:

1. A method of presenting on a presentation device a mark modeling a contact area between an implement surface and a marking surface, the method comprising:
   receiving a marking event that specifies a tilt measurement of a tilt sensitive input device;
   determining a geometry of the mark based on the tilt measurement, wherein the determined geometry comprises a size and shape of the mark;
   determining an intensity distribution within the determined geometry of the mark based on the tilt measurement, the intensity distribution defining a plurality of different values of intensity at respective different locations within the determined geometry of the mark;
   presenting the mark having the determined geometry and intensity distribution via the presentation device; and
   mapping the geometry of the mark to an impression bitmap with a bitmap size, wherein the bitmap size is a maximum bitmap size multiplied by a scale factor, wherein the scale factor varies based on the tip geometry and tilt angle measurement.

2. The method of claim 1, wherein the marking event further specifies a bearing measurement of the tilt sensitive input device and wherein determining one or both of the geometry of the mark and intensity distribution within the mark are further based on the bearing measurement.

3. The method of claim 1, further comprising:
   selecting a tip geometry corresponding to a physical marking implement;
   wherein determining one or both of the geometry of the mark and the intensity distribution within the mark are further based on the selected tip geometry.

4. The method of claim 1, wherein the implement surface is customizable by a user.

5. The method of claim 1, wherein the implement surface is defined by a combination of user defined tip geometry properties.

6. The method of claim 1, wherein the intensity distribution is determined so that the plurality of different intensity values represent variations in pressure between the implement surface and the marking surface over the modeled contact area.

7. The method of claim 1, wherein the impression bitmap comprises a plurality of pixels, and wherein the intensity distribution defines a respective one of the plurality of intensity values for each of the pixels.

8. A system for presenting a mark modeling a contact area between an implement surface and a marking surface, the system comprising:
   a tilt sensitive input device configured to input a marking event that indicates a tilt measurement of the tilt sensitive input device;
   a determining module configured to determine a geometry of the mark and an intensity distribution within the mark based on the tilt measurement, the determined geometry comprising a size and shape of the mark, the determined intensity distribution defining a plurality of different values of intensity at respective different locations within the determined geometry of the mark;
   a presentation device configured to present the mark having the determined geometry and intensity distribution; and
   a mapping module configured to map the geometry of the mark to an impression bitmap with a bitmap size, wherein the bitmap size is a maximum bitmap size multiplied by a scale factor, wherein the scale factor varies based on the tip geometry and tilt angle measurement.

9. The system of claim 8, further comprising:
   rendering circuitry configured to render the mark on the presentation device.

10. The system of claim 8, wherein the marking event further specifies a bearing measurement of the tilt sensitive input device and one or both of the geometry of the mark and intensity distribution within the mark are further based on the bearing measurement.

11. The system of claim 8, wherein the tilt sensitive input device is further configured to select a tip geometry corresponding to a physical marking implement;
    wherein one or both of the geometry of the mark and the intensity distribution of the mark are further based on the selected tip geometry.

12. The system of claim 8, wherein the implement surface is customizable by a user.

13. The system of claim 8, wherein the implement surface is defined by a combination of user defined tip geometry properties.

14. The system of claim 8, wherein the impression bitmap comprises a plurality of pixels, and wherein the intensity distribution defines a respective one of the plurality of intensity values for each of the pixels.

15. A method of presenting on a presentation device a mark modeling a contact area between an implement surface and a marking surface, the method comprising:
    receiving a marking event that specifies a tilt measurement of a tilt sensitive input device;
    finding the mark that corresponds to the tilt measurement in a look-up table, the look-up table storing a plurality of marks having respective geometries for a corresponding plurality of tilt measurements, the geometries comprising a size and shape;

determining an intensity distribution within the mark based on the tilt measurement, the intensity distribution defining a plurality of different values of intensity at respective different locations within the geometry of the mark corresponding to the tilt measurement;

presenting the mark having the respective geometry and determined intensity distribution via the presentation device; and mapping the geometry of the mark to an impression bitmap with a bitmap size, wherein the bitmap size is a maximum bitmap size multiplied by a scale factor, wherein the scale factor varies based on the tip geometry and tilt angle measurement.

16. The method of claim 15, wherein the marking event further specifies a bearing measurement of the tilt sensitive input device and wherein finding the mark further includes finding the mark corresponding to the bearing measurement in the look-up table.

17. The method of claim 15, further comprising:
selecting a tip geometry corresponding to a physical marking implement;
wherein finding the mark further includes finding the mark corresponding to the selected tip geometry in the look-up table.

18. The method of claim 15, wherein the implement surface is customizable by a user.

19. The method of claim 15, wherein the implement surface is defined by a combination of user defined tip geometry properties.

20. A non-transitory computer-readable medium storing computer-readable instructions for execution by a processor to perform a method of defining a mark modeling a contact area between an implement surface and a marking surface comprising:
receiving a marking event that specifies a tilt measurement of a tilt sensitive input device;
determining a geometry of the mark and an intensity distribution within the mark based on the tilt measurement, the determined geometry comprising a size and shape of the mark, the determined intensity distribution defining a plurality of different values of intensity at respective different locations within the determined geometry of the mark; and
mapping the geometry of the mark to an impression bitmap with a bitmap size, wherein the bitmap size is a maximum bitmap size multiplied by a scale factor, wherein the scale factor varies based on the tip geometry and tilt angle measurement.

21. The non-transitory computer-readable medium of claim 20, wherein the marking event further specifies a bearing measurement of the tilt sensitive input device and one or both of the geometry of the mark and intensity distribution within the mark are further based on the bearing measurement.

22. The non-transitory computer-readable medium of claim 20, wherein the method further comprises:
selecting a tip geometry corresponding to a physical marking implement;
wherein one or both of the geometry of the mark and the intensity distribution of the mark are further based on the selected tip geometry.

23. A non-transitory computer-readable medium storing computer-readable instructions for execution by a processor to perform a method of finding a mark modeling a contact area between an implement surface and a marking surface comprising:
receiving a marking event that specifies a tilt measurement of a tilt sensitive input device;
finding the mark that corresponds to the tilt measurement in a look-up table finding the mark that corresponds to the tilt measurement in a look-up table, the look-up table storing a plurality of marks having respective geometries for a corresponding plurality of tilt measurements, the geometries comprising a size and shape;
determining an intensity distribution within the mark based on the tilt measurement, the intensity distribution defining a plurality of different values of intensity at respective different locations within the geometry of the mark corresponding to the tilt measurement; and
mapping the geometry of the mark to an impression bitmap with a bitmap size, wherein the bitmap size is a maximum bitmap size multiplied by a scale factor, wherein the scale factor varies based on the tip geometry and tilt angle measurement.

24. The non-transitory computer-readable medium of claim 23, wherein the marking event further specifies a bearing measurement of the tilt sensitive input device and wherein finding the mark further includes finding the mark corresponding to the bearing measurement in the look-up table.

25. The non-transitory computer-readable medium of claim 23, wherein the method further comprises:
selecting a tip geometry corresponding to a physical marking implement;
wherein finding the mark further includes finding the mark corresponding to the selected tip geometry in the look-up table.

* * * * *

UNITED STATES PATENT AND TRADEMARK OFFICE
CERTIFICATE OF CORRECTION

PATENT NO.        : 8,493,340 B2  
APPLICATION NO.   : 12/464943  
DATED             : July 23, 2013  
INVENTOR(S)       : Tremblay Page 1 of 1

It is certified that error appears in the above-identified patent and that said Letters Patent is hereby corrected as shown below:

In the Specification

In Column 14, Line 45, delete "memory section 1204," and insert -- memory section 1208, --, therefor.

Signed and Sealed this
First Day of October, 2013

Teresa Stanek Rea
*Deputy Director of the United States Patent and Trademark Office*